United States Patent [19]

Kitamura et al.

[11] Patent Number: 5,280,482
[45] Date of Patent: Jan. 18, 1994

[54] TIME-SHARING DATA TRANSFER APPARATUS

[75] Inventors: Hideaki Kitamura; Toshifumi Inoue, both of Kyoto, Japan

[73] Assignee: Dainippon Screen Mfg. Co., Ltd., Kyoto, Japan

[21] Appl. No.: 896,635

[22] Filed: Jun. 10, 1992

[30] Foreign Application Priority Data

Jun. 17, 1991 [JP] Japan ............................. 3-173222

[51] Int. Cl.$^5$ ............................................. H04L 12/40
[52] U.S. Cl. ................................ 370/85.7; 370/85.11
[58] Field of Search ............... 370/85.11, 85.9, 85.7, 370/85.1, 95.3, 95.1

[56] References Cited

U.S. PATENT DOCUMENTS

| | | | |
|---|---|---|---|
| 4,400,778 | 8/1983 | Vivian et al. | 395/325 |
| 4,491,916 | 1/1985 | Vallhonrat | 395/325 |
| 4,600,988 | 7/1986 | Tendulkar et al. | 364/200 |
| 4,669,079 | 5/1987 | Blum | 370/85.11 |
| 4,837,785 | 6/1989 | McAlpine | 370/85.1 |

FOREIGN PATENT DOCUMENTS

0028891A1  5/1981  European Pat. Off.

OTHER PUBLICATIONS

"Dynamic Slot Allocation in Data Transmission System" by H. Buerge et al., IBM Technical Disclosure Bulletin, vol. 19, No. 7, Dec. 1976, pp. 2725-2726.
"Bus Arbiter with Dynamic Priority Adjustment", IBM Technical Disclosure Bulletin, vol. 29, No. 8, Jan. 1987, pp. 3272-3273.

Primary Examiner—Douglas W. Olms
Assistant Examiner—Hassan Kizou
Attorney, Agent, or Firm—Lowe, Price, LeBlanc & Becker

[57] ABSTRACT

An apparatus for transferring data in a time-sharing mode includes a plurality of modules connected to a common bus line for transferring data therethrough, a bus controller for controlling a time-sharing transfer of data between the modules, and a system controller connected to the modules and bus controller through a bidirectional command line. The system controller is operable, upon receipt of a data transfer request or data transfer completion notice from certain of the modules, to command the bus controller to generate or eliminate a bus slot. Then, the bus controller sets a new bus slot to a bus cycle, or eliminates a designated slot from the bus cycle, thereby to vary the number of slots constituting the bus cycle. Slot enable signals corresponding to the respective slots are transmitted to the modules through the bus line. Each module successively compares a slot number and slot enable signals, and exchanges data with the bus line upon agreement between the slot number and slot enable signals.

7 Claims, 12 Drawing Sheets

TIME-SHARING DATA TRANSFER APPARATUS

BACKGROUND OF THE INVENTION (1) Field of the Invention

The present invention relates to a time-sharing data transfer apparatus for a data processing system including a plurality of modules interconnected through a common data bus, in which the modules use the data bus in a time-sharing mode for data transfer.

(2) Description of the Related Art

The following methods have heretofore been proposed for utilizing a common data bus in a time-sharing mode to transfer data among modules constituting a system:

Prior Art Example

In a first prior art example of data transfer control methods, a single handshake line interconnects a plurality of operational modules which execute unit processes included in a series of operations, respectively, and share a single data bus line. The handshake line is used to form gate circuits among the operational modules. Separate transmission and reception timing is set to the individual operational modules. The modules use the data bus for data transfer among themselves, according to use timing synchronized with handshake clock pulses and assigned in a time-sharing manner. Such data transfer is based on information from the gate circuits that the transmitting and receiving modules coincide in readiness to transmit data to the data bus and receive the data from the data bus.

Second Prior Art Example

A second prior art example, which is an image processing method, has a plurality of operational modules for processing image data through distinct sequences of their own, a common data bus line for supplying the image data to the operational modules, and a clock generator for generating data input/output signals with particular timing provided by dividing each bus cycle for controlling data transfer between the operational modules and data bus line. Thus, the operational modules are allowed to process the image data in a selected order.

The above prior art examples are applicable where data are transferred among the operational modules that process data in a fixed order, or among the modules that process data in a selected order. The data are processed in a desired order by applying the data processing order as a preset data to the modules. To achieve this, each bus cycle determined according to the number of operational modules constituting a system has a fixed length. Further, a plurality of time divisions constituting one bus cycle (hereinafter called bus slots) are fixedly assigned to the respective modules in advance.

However, where the modules constituting a data processing system process data independently of one another, it is undesirable from the viewpoint of data transfer efficiency to employ the prior art method having a fixed bus cycle length or bus slots fixedly assigned to the modules. That is, when only part of the modules require data transfer, the length of one bus cycle should, for the sake of data transfer efficiency, be decreased according to the number of modules requiring the data transfer. Conversely, when an increased number of modules require data transfer, the bus cycle length should be increased accordingly. Further, if one module demands more data than other modules, it will be more effective to assign a greater number of bus slots in one bus cycle to that module than to the other modules.

SUMMARY OF THE INVENTION

The present invention has been made having regard to the state of the art noted above. The object of the present invention, therefore, is to provide a time-sharing data transfer apparatus for transferring data among a plurality of modules in a time-sharing mode through a common data bus, in which the number of bus slots constituting one bus cycle is variable with requests from the modules, thereby to enable an efficient transfer of data.

The above object is fulfilled, according to the present invention, by an apparatus for transferring data in a time-sharing mode by setting bus slots as minimum time units of data transfer and repeating a bus cycle formed of a plurality of bus slots corresponding to the number of data transfer requests, the apparatus comprising:

a plurality of modules connected to a common bus line for transferring data therethrough, a bus controller for controlling a time-sharing transfer of data between the modules through the bus line, and a system controller connected to the modules and the bus controller through a bidirectional command line;

wherein the system controller is operable, upon receipt of a data transfer request from certain of the modules, to command the bus controller to generate a bus slot necessary for the data transfer, and to notify the certain of the modules of a slot number for use in the data transfer, and upon receipt of data completion transfer notice from the certain of the modules, to command the bus controller to eliminate the bus slot;

the bus controller is operable, upon receipt of a slot set command from the system controller, to set a new bus slot to a bus cycle including a group of bus slots currently used, thereby increasing the number of bus slots, and to transmit slot enable signals peculiar to the respective bus slots repeatedly, and upon receipt of a slot eliminate command from the system controller, to eliminate from the bus cycle a designated one of the bus slots currently used in the data transfer, thereby decreasing the number of bus slots, and to transmit the slot enable signals peculiar to the remaining bus slots repeatedly; and each of the modules is operable to compare successively a series of slot enable signals received from the bus controller with a slot number given in advance by the system controller, and to exchange data with the bus line upon agreement between the slot enable signals and the slot number.

The present invention has the following functions.

When a data transfer request is received from certain of the modules through the command line, the system controller designates a suitable bus slot from the bus slots currently out of use, commands the bus controller to establish this bus slot, and notifies the slot number of this bus slot to the modules concerned. If this data transfer should be carried out at high speed, the system controller commands the bus controller to generate the same bus slot plural times in one bus cycle. Upon receipt of the slot set command, the bus controller sets the designated new bus slot to the bus cycle formed of bus slots currently used, thereby increasing the number of bus slots. The bus controller repeatedly transmits slot enable signals peculiar to these slots. The modules taking part in the data transfer compare successively a series of slot enable signals received from the bus controller with the slot number given in advance by the system controller, and exchange data with the bus line upon agreement between the slot enable signals and the slot number.

When the system controller receives notice of completion of data transfer between certain of the modules, the system controller commands the bus controller to eliminate the bus slot used in this data transfer. Then, the bus controller eliminates the designated bus slot from the bus cycle having a group of bus slots currently used in data transfer, thereby decreasing the number of bus slots. The bus controller repeatedly transmits slot enable signals peculiar to the remaining slots.

It will be understood from the above description that, in the time-sharing data transfer apparatus according to the present invention, the number of slots constituting one bus cycle is variable with an existing number of data transfer requests. When certain data transfer should be carried out at high speed, the same slot is generated plural times in one bus cycle. Thus, efficient data transfer is effected among a plurality of modules while using the common bus line.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

DETAILED DESCRIPTION OF THE PREFERRED EMBODIMENT

A preferred embodiment of the present invention will be described in detail hereinafter with reference to the drawings.

Figure 1:
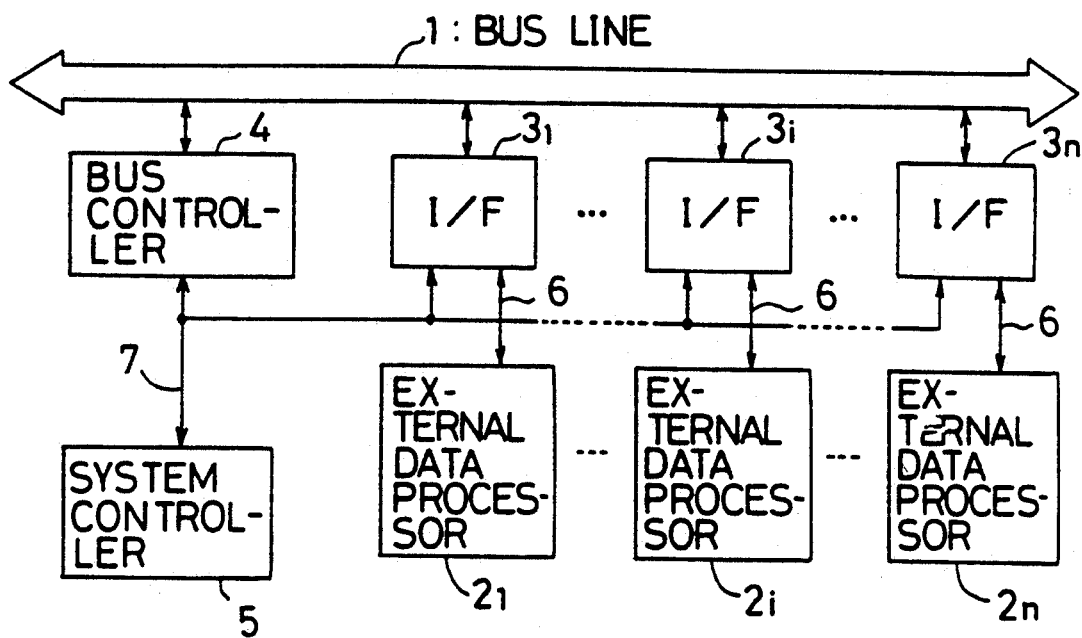
FIG. 1 is a block diagram showing an outline of a time-sharing data transfer apparatus according to the present invention.

FIG. 1 is a block diagram showing an outline of a time-sharing data transfer apparatus.

This apparatus includes a bus line 1, a plurality of external data processing units 2 ($2_1, \ldots, 2i, \ldots, 2n$), and interface circuits 3 ($3_1, \ldots, 3i, \ldots, 3n$). The interface circuits 3 are associated with the external data processing units 2, respectively, and use the bus line 1 in a time-sharing mode for data transfer among themselves. In this embodiment, the bus line 1 includes a data bus having 32 signal lines, and a control bus having 7 signal lines. The external data processing units 2 and interface circuits 3 formed in pairs correspond to the modules according to the present invention.

The external data processing units 2 are not limited to any particular types. In the case of a page makeup system for use in a plate making process, for example, these units 2 may be an image pickup scanner for reading original images, an external image storage such as an optical disk for storing image data read by the scanner, an image processor for cutting particular images out of the image data read from the external storage or working on a layout of such images, a monitor for displaying the layout of images, and a recording scanner for recording such images on films.

The interface circuits 3 may have a function only to output data to the bus line 1, a function only to input data therefrom, or both the output and input functions. This depends on the functions of the external data processing units 2 to which the interface circuits 3 are connected. The external data processing unit 2 and interface circuit 3 in each pair are interconnected through an external connecting line 6 having 32 data lines and 2 handshake lines.

The illustrated apparatus further includes a bus controller 4 for outputting bus control data necessary to the time-sharing transfer of data among the interface circuits 3 connected to the bus line 1. Details of the bus control data will be described later. Here, the concepts of "bus cycles" and "bus slots" determined by the bus controller 4 for the time-sharing transfer of data will be described with reference to FIGS. 2 and 3.

Figure 2:
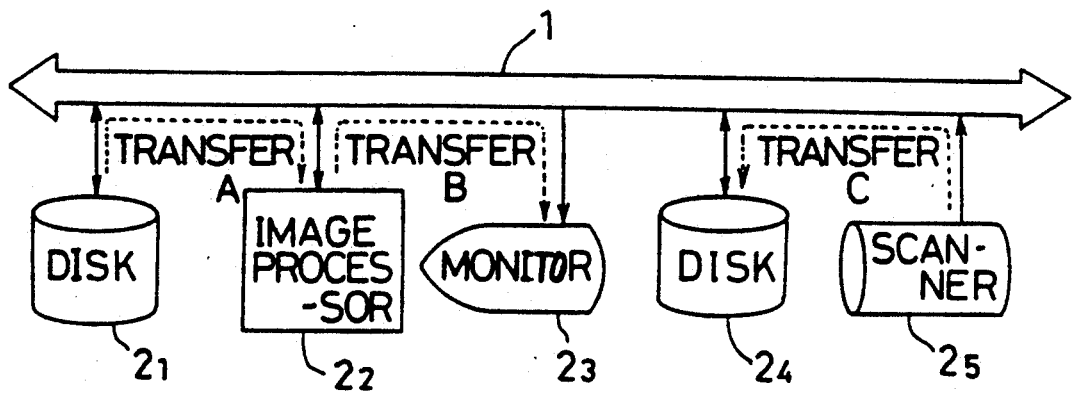
FIG. 2 is an explanatory view of a way in which data are transferred among external data processing units.

FIG. 2 shows several external data processing units 2 by way of example, with the interface circuits 3 and bus controller 4 not shown. FIG. 3 shows relations between bus slots and bus cycles. The bus controller 4 has a function to divide a transfer time axis of the 32-bit data bus in the bus line 1 by a predetermined minimum unit of data transfer time (e.g. 200 nsec). This minimum time unit is herein called "bus slot" or simply "slot". One bus slot allows a single act of data transfer to take place between certain of the external data processing units 2.

Figure 3A:
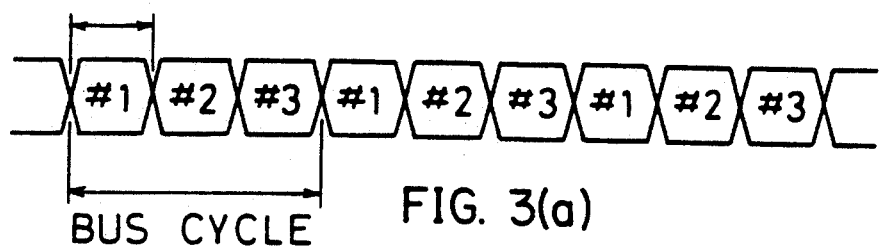
FIGS. 3(a)-3(d) is an explanatory views of bus cycles each including a plurality of bus slots.

The bus slots are generated in the number corresponding to the number of data transfer requests made to the data bus. Assume that, as shown in FIG. 2 for example, requests have been made simultaneously for data transfer among the external data processing units 2, i.e. for data transfer A from a disk $2_1$ to an image processor $2_2$, data transfer B from the image processor $2_2$ to a color monitor $2_3$, and data transfer C from a scanner $2_5$ to a disk $2_4$. In this case, the bus controller 4 establishes three bus slots #1, #2 and #3 as shown in FIG. 3(a), for effecting transfers A, B and C, respectively. These bus slots #1-#3 are repeated till completion of the data transfers. The repetition of the bus slots is herein called "bus cycles".

Figure 3B:
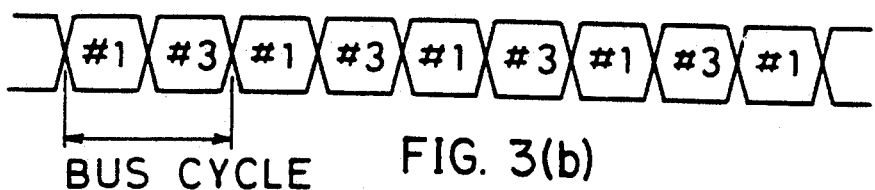
Figure 3C:
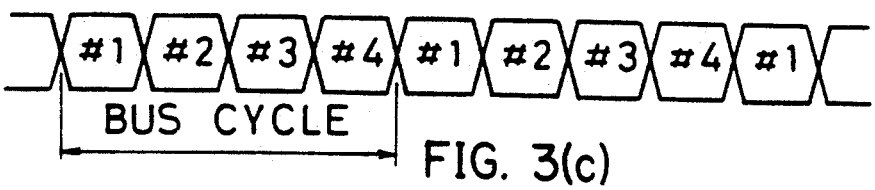
Figure 3D:
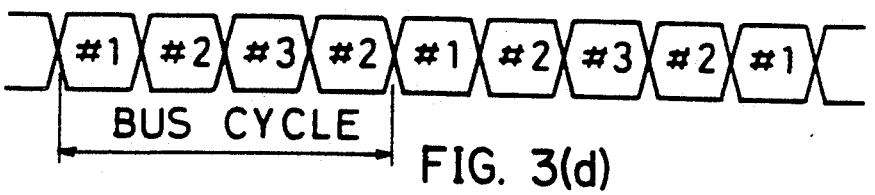

Thus, the bus cycles are variable with the number of data transfer requests. In the above example, if transfer B is completed first, the bus cycles will include slots #1 and #3 as shown in FIG. 3(b). On the other hand, if an additional data transfer request or requests is/are made, the bus cycles may include four or more bus slots as shown in FIG. 3(c). The bus cycles are not necessarily formed of different bus slots only. In the example shown in FIG. 2, data transfer B may have to be faster than data transfers A and C. In this case, as shown in FIG. 3(d), the same bus slot (which is bus slot #2 in the illustrated example) may be generated plural times for one bus cycle. The bus controller 4 carries out such a bus slot generating operation which will be described in greater detail later.

Specifically, the bus controller 4 outputs signals corresponding to the bus slots generated (hereinafter called "slot enable signals") to the control bus in the bus line 1. The interface circuits 3 are thereby notified of time-sharing transfer timing.

Reverting to FIG. 1, the time-sharing data transfer apparatus further includes a system controller 5 for controlling the entire apparatus. The system controller 5 is connected to the respective interface circuits 3 and bus controller 4 through a bidirectional command line 7. The bus controller 4 monitors identification numbers of the bus slots generated by the bus controller 4 (hereinafter called "slot numbers"). Upon receipt of a data transfer request from any one of the external data processing units 2 through the interface circuit 3 associated therewith, the system controller 5 designates a slot number among the bus slots currently out of use, and commands the bus controller 4 to generate a bus slot corresponding to that slot number. At the same time, the system controller 5 transmits the slot number to the interface circuits 3 of the external data processing units 2 taking part in the data transfer. As will be described in detail later, each interface circuit 3 compares the slot number from the system controller 5 successively with the slot enable signals transmitted from the bus controller 4 through the control bus. The interface circuits 3 ascertain data transfer timing by agreement between the slot number and slot enable signal.

Next, a connecting structure between bus line 1 and interface circuit 3 and a connecting structure between interface circuit 3 and external data processing unit 2 will be described with reference to FIG. 4. The bus line 1 and each interface circuit 3 are interconnected through the data bus DB having 32 signal lines and through the control bus having 7 signal lines. Specifically, the control bus has the following lines:

(1) A basic clock line: This is a single signal line for transmitting basic clock CL. The basic clock CL is outputted from the bus controller 4.

(2) A bus clock line: This is a single signal line for transmitting bus clock BCL having a cycle period twice that of the basic clock. The bus clock BCL is outputted from the bus controller 4.

(3) Slot enable lines: These are signal lines for transmitting slot enable signals SE generated by the bus controller 4. This embodiment provides four slot enable lines. Each slot enable signal SE has four bits, and therefore the bus controller 4 is capable of generating 16 types of bus slots #1–#16. The number of bits constituting each slot enable signal SE may be increased to allow a greater number of bus slots to be generated.

(4) Data valid line: This is a single signal line for allowing a handshake between data transferring interface circuits 3. This line itself forms a wired AND by being pulled up to logic [1] (normally 5 V) by a pull-up resistor, not shown, provided on the line. The signal on the data valid line is hereinafter called the data valid (DV) signal.

Figure 4:
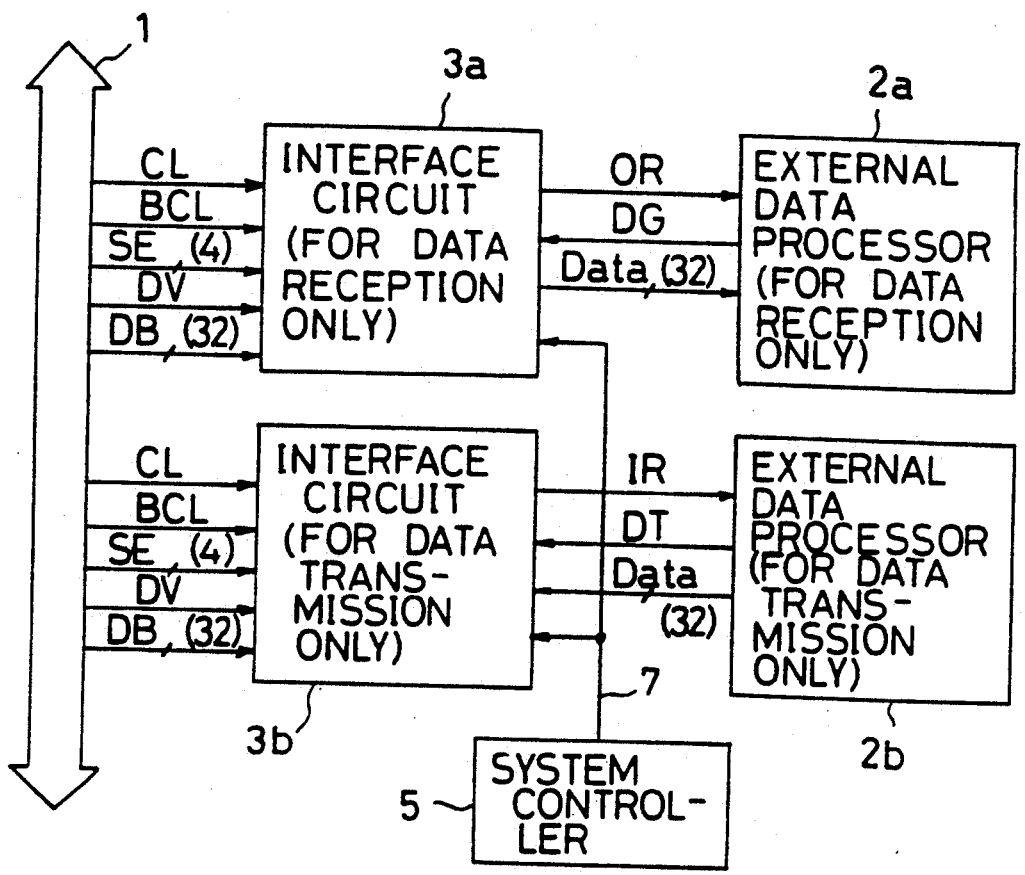
FIG. 4 is an explanatory view of a way in which interface circuits are connected.

An interface circuit 3a and an external data processing unit 2a for data reception only, shown in FIG. 4, are interconnected through 32 data lines for transferring data and 2 handshake lines for allowing a handshake as noted hereinbefore. Signals for the handshake include a data output ready signal OR transmitted from the interface circuit 3a to the external data processing unit 2a when data is ready for transmission, and a data gain signal DG transmitted from the external data processing unit 2a to the interface circuit 3a when data is received by the external data processing unit 2a. Similarly, an interface circuit 3b and an external data processing unit 2b for data transmission only are interconnected through 32 data lines and 2 handshake lines. Signals for the handshake therebetween include a data input ready signal IR transmitted from the interface circuit 3b to the external data processing unit 2b when data is ready for reception, and a data transmit signal DT transmitted from the external data processing unit 2b to the interface circuit 3b when data is transmitted from the external data processing unit 2b.

The bus controller 4 has a slot enable signal output section which will be described next with reference to FIG. 5.

The bus controller 4 includes a CPU 41 acting as a slot setter for generating slot numbers and a varied number of bus slots constituting one bus cycle (number-of-set-slots data) in response to slot generation commands received from the system controller 5, latch circuits L15a, L14a, L13a, ... L0a for latching the slot numbers, latch circuits L15b, L14b, L13b, ... L0b corresponding to the latch circuits L15a–L0a (the reason for providing the two groups of latch circuits will be described later), latch circuits LN1 and LN2 for latching the number-of-set-slots data, a selector circuit 42 acting as a slot number selector for selecting one of outputs from the latch circuits L15b–L0b, a counter 43 acting as a select signal generator for applying a select signal to the selector circuit 42, a basic clock generating circuit 45, a bus clock generating circuit 46, a reference pulse generating circuit 47, a gate circuit 48, an SR flip-flop 49, a monostable multivibrator 50, and a latch circuit 51.

Figure 6:
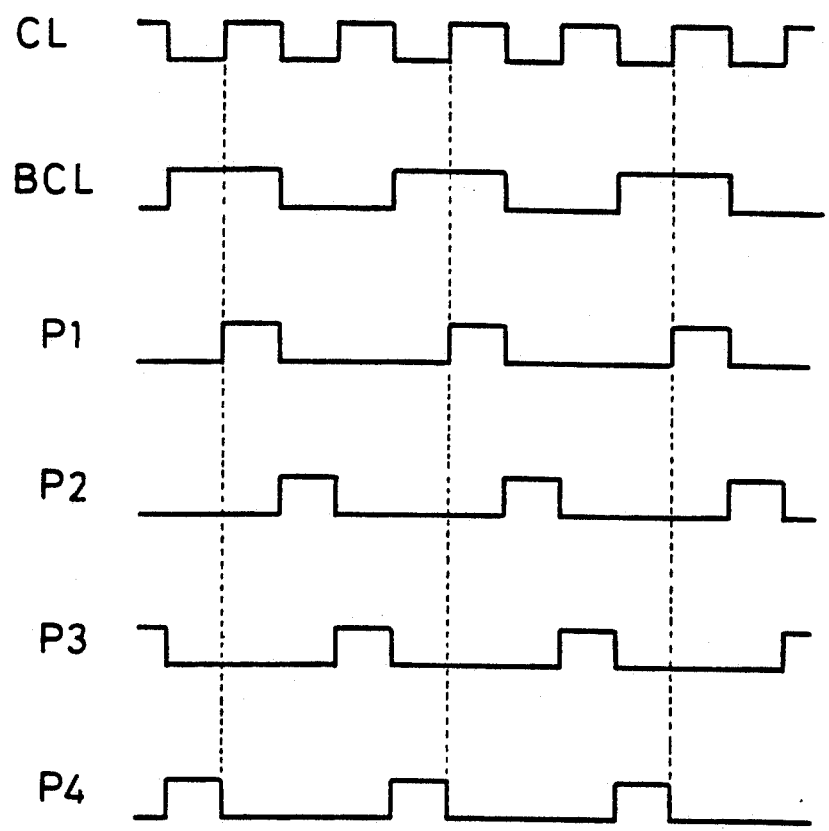
FIG. 6 is a waveform diagram of pulses used in time-sharing transfer control.

The basic clock generating circuit 45, bus clock generating circuit 46, and reference pulse generating circuit 47 generate the basic clock CL, the bus clock BCL having a cycle period twice that of the basic clock, and reference pulses P1–P4 as shown in FIG. 6, respectively. The basic clock CL and bus clock BCL are transmitted also to the interface circuits 3 through the bus line 1 as noted hereinbefore.

Operations of the bus controller 4 to generate (and eliminate) the slots will be described in sequence hereinafter.

Figure 7:
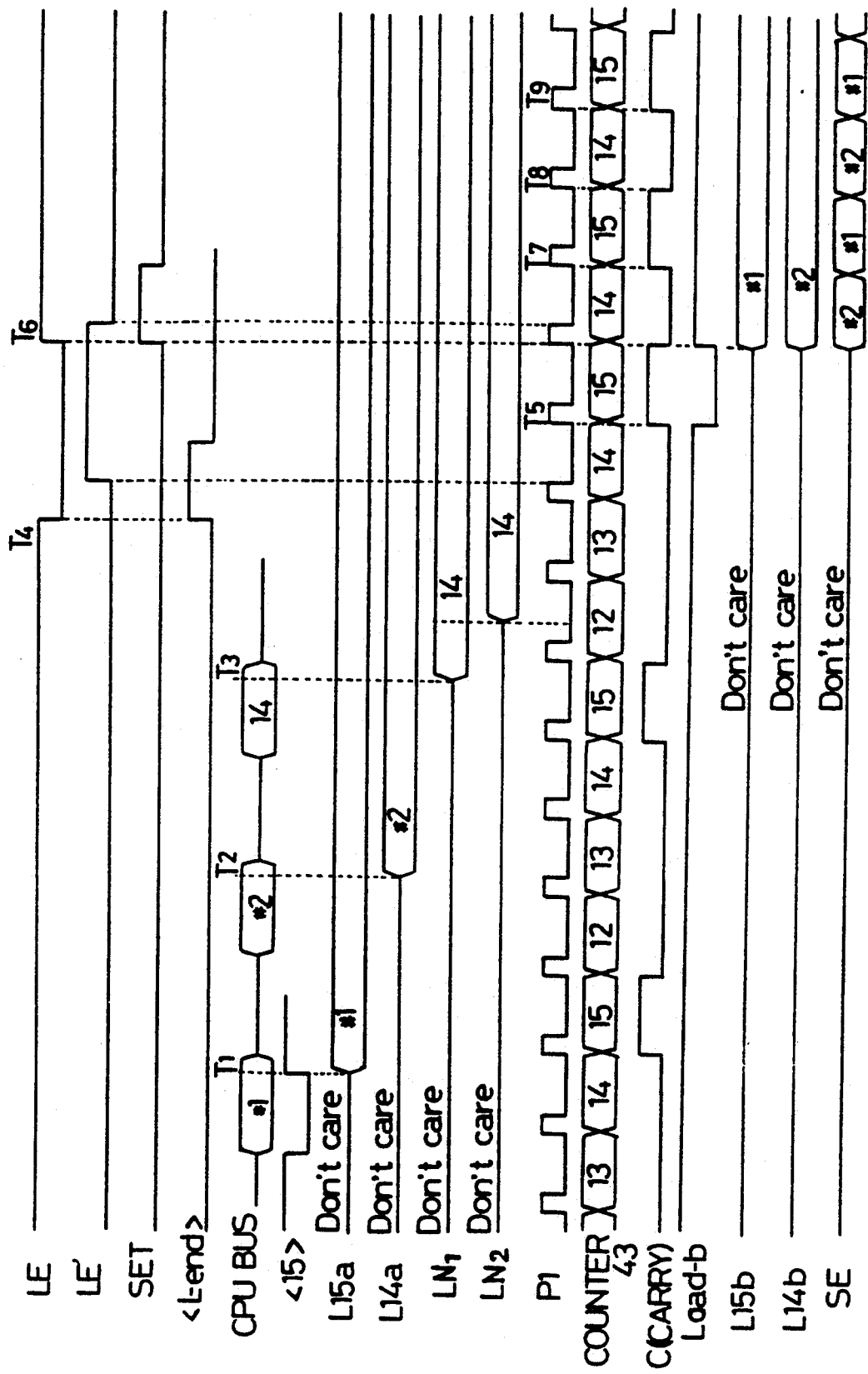
FIG. 7 is a timing chart showing an operation of the bus controller for generating a plurality of bus slots.

(A) Generation of a selected number of slots:

Reference is now made to the timing chart of FIG. 7. Assume that the system controller 5 commands the bus controller 4 to establish two bus slots #1 and #2. In response to this command, the CPU 41 of the bus controller 4 generates data output pulses at a slot set output port <15> thereof, and at the same time outputs to a CPU bus a 4-bit data [0001] corresponding to slot #1. This data is latched by the latch circuit L15a with a rise (at a point of time T1 in FIG. 7) of the data output pulses outputted from the output port <15>.

Subsequently, the CPU 41 generates data output pulses at a slot set output port <14> thereof, and outputs to the CPU bus a data [0010] corresponding to slot

2. This data is latched by the latch circuit L14a with a rise (at a point of time T2 in FIG. 7) of the data output pulses (not shown) outputted from the output port <14>.

When the data corresponding to slots #1 and #2 have been latched, the CPU 41 generates data output pulses at a slot number set output port <N>, and outputs to the CPU bus the value complementary to 2 in the 4-bit structure of the number of slots currently generated. For example, "15" is outputted if the number of slots in one bus cycle is "1", "14" if the number of slots is "2", "13" if the number of slots is "3", "1" if the number of slots is "15", and "0" if the number of slots is "16". In this assumed case, the number of slots established is "2", and therefore "14" (i.e. a 4-bit data [1110]) is outputted to the CPU bus. This data is latched by the latch circuit LN1 with a rise (at a point of time T3 in FIG. 7) of the data output pulses outputted from the output port <N>. This data is latched also by the latch circuit LN2 with a next rise of reference pulses P3.

Upon completion of data setting to all of the latch circuits Lxxa (the subscripts xx represent "15" to "0"), the CPU 41 generates control pulses at an output port <L-end> to transfer these data to the corresponding latch circuits Lxxb. These control pulses form a reset signal applied to the RS flip-flop 49, whereby a Q-terminal output signal LE thereof becomes "L" level (at a point of time T4 in FIG. 7). The "L" level output signal of the RS flip-flop 49 is applied to a D input terminal of the latch circuit 51. As a result, a Q-bar terminal output signal LE' of the latch circuit 51 becomes "H" level with a rise of reference pulses P2 inputted to a clock terminal CK of the latch circuit 51. This "H" level output signal LE' cancels gating action of the gate circuit 48, thereby allowing a carry signal C of the counter 43 to emerge as an output signal Load-b from the gate circuit 48.

The counter 43 increments output data (in 4 bits) with each rise of clock CK inputted thereto. On the other hand, when a load clock terminal LDC is in "H" level, the counter 43 presets data inputted to a load data terminal LDD with a rise of clock CK. The carry signal C outputted from a carry terminal becomes "H" level when the count of the counter 43 reaches "15". The carry signal C becomes "L" level upon presetting of "14" to the counter 43.

Assume that value "12" is set to the latch circuit LN2 in an initial state of the timing chart of FIG. 7. Then, the counter 43 raises the carry signal C to "H" level at a point of time T5. This carry signal C is outputted from the gate circuit 48 as the signal Load-b. The contents of the latch circuits Lxxa are transferred to the latch circuits Lxxb at a point of time T6 of a rise of the output signal Load-b. At the same time, the monostable multivibrator 50 is triggered to generate pulses having a fixed time width, e.g. 200 nsec. These pulses (SET signal) set the RS flip-flop 49, whereby the Q-bar terminal output signal LE' of the latch circuit 51 becomes "L" level for allowing the gate circuit 48 to take gating action. The carry signal C thereafter generated by the counter 43 does not cause output data of the latch circuits Lxxa to be latched by the latch circuits Lxxb.

Consequently, the 4-bit data [0001] and [0010] are inputted to input terminals <15> and <14> of the selector circuit 42, respectively. Simultaneously therewith, i.e. at the point of time T6, the counter 43 receives data (which is "14") from the latch circuit LN2 at the LDD terminal to use it as preset data.

At this time, the count of the counter 43 is "14" which is applied as an output data to a select terminal SEL of the selector circuit 42. As a result, the 4-bit data [0010] inputted to the input terminal <14> of the selector circuit 42 is selected and outputted through a buffer 44 to a slot enable line in the bus line 1. This 4-bit data is a slot enable signal SE#2 corresponding to slot #2.

The counter 43 is incremented to count "15" by a next reference pulse P1 (at a point of time T7 in FIG. 7). This count is outputted to select terminal SEL of the selector circuit 42, whereby the 4-bit data [0001]inputted to the input terminal <15> of the selector circuit 42 is selected and outputted to a slot enable line in the bus line 1. This 4-bit data is a slot enable signal SE#1 corresponding to slot #1.

The moment the count of the counter 43 becomes "15", the carry signal C becomes "H" level again. With a next rise of the reference pulses P1 (at a point of time T8 in FIG. 7), the data "14" of the latch circuit LN2 is preset to the counter 43 again. As a result, the counter 43 outputs the data "14" whereby the selector circuit 42 outputs the slot enable signal SE#2 corresponding to slot #2.

The counter 43 is incremented by a next reference pulse P1 (at a point of time T9 in FIG. 7), thereby to output data "15". Then, the selector circuit 42 outputs the slot enable signal SE#1.

In this way, a bus cycle formed of the slot enable signals SE#1 and SE#2 is repeated in synchronism with rises of the reference pulses P1. The two groups of latch circuits Lxxa and Lxxb are provided between the CPU 41 and selector circuit 42 in order to adjust operating timing of CPU 41 and selector circuit 42. This is desirable since, generally, the operation of CPU 41 is not synchronized with the selector circuit 42 or the like which is an external circuit under control.

(B) Increasing the number of slots:

An operation to increase the number of slots to be used from 2 to 3 will be described next with reference to the timing chart of FIG. 8. It is assumed here that slots #1 and #2 are currently used. In response to requests from the external data processing units 2, the system controller 5 designates unused slots in the order of numbering, and commands the bus controller 4 to generate these slots. In this example, slot #3 is generated.

In response to the command from the system controller 5 to establish slot #3, the CPU 41 of the bus controller 4 generates data output pulses at a slot set output port <13> (not shown), and at the same time outputs to the CPU bus a 4-bit data [0011] corresponding to slot #3. This data is latched by the latch circuit L13a (not shown) at a point of time T1 in FIG. 8.

Figure 8:
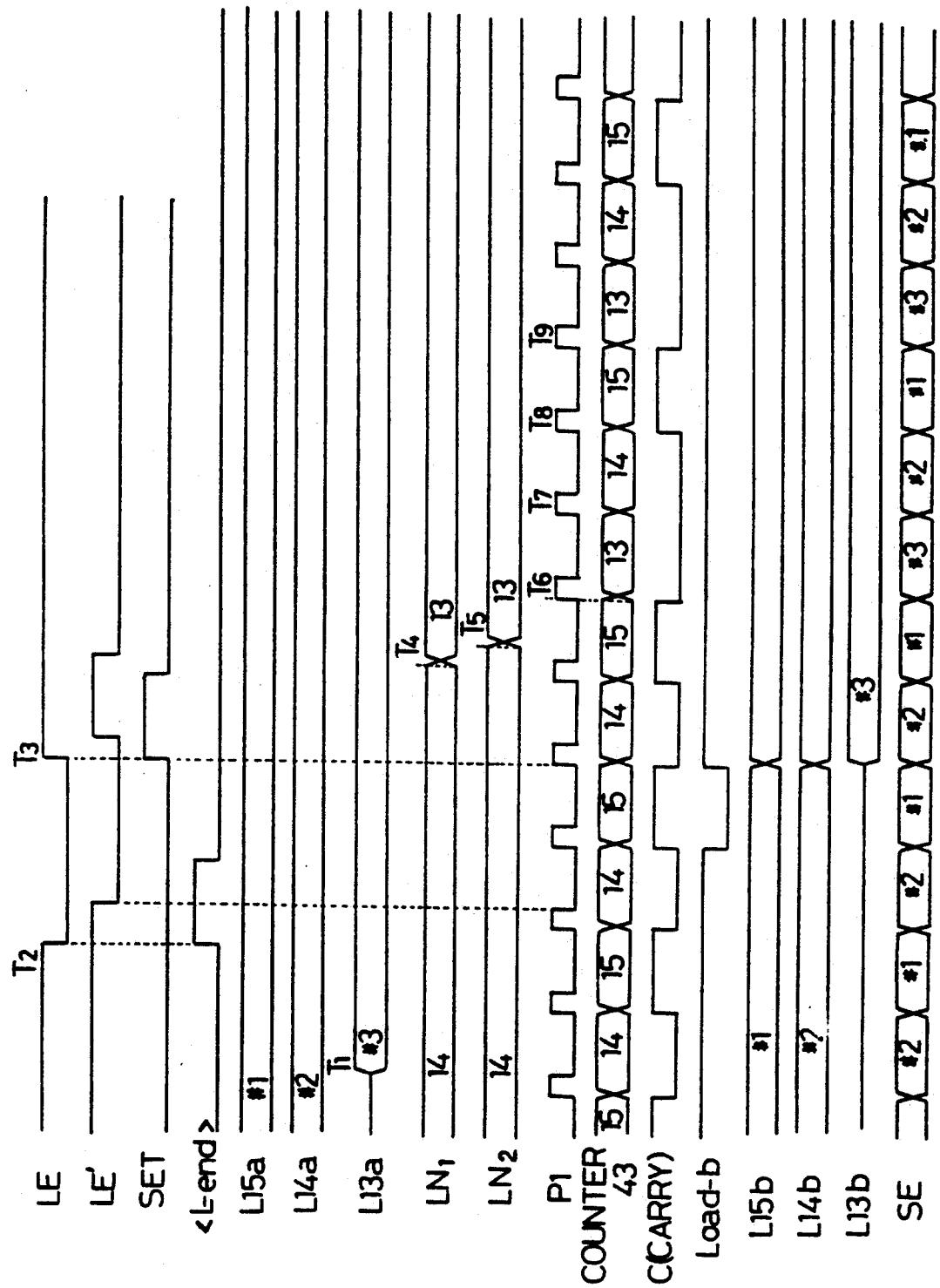
FIG. 8 is a timing chart showing an operation of the bus controller for increasing the number of bus slots.

The CPU 41 then generates control pulses at the output port <L-end> to transfer the data from the latch circuit L13a to the latch circuit L13b (not shown) (at a point of time T2 in FIG. 8). Consequently, the contents of the latch circuit L13a are transferred to the latch circuit L13b with a next fall of the carry signal C of the counter 43 (at a point of time T3 in FIG. 8).

Next, in order to increase the number of slots on the bus, the CPU 41 generates data output pulses at the slot number set output port <N>, and outputs to the CPU bus the value "13" complementary to 2 in the 4-bit structures of the number of slots currently generated which is "3". This data is latched by the latch circuit LN1 at a point of time T4 in FIG. 8, and is latched also by the latch circuit LN2 with a next rise of reference pulses P3 (at a point of time T5 in FIG. 8).

The output data "13" of the latch circuit LN2 is preset to the counter 43 with a next rise of reference pulses P1 (at a point of time T6 in FIG. 8). At this time, the count of the counter 43 is "13" which is applied as an output data to the selector circuit 42. As a result, the selector circuit 42 outputs the data [0011] inputted from the latch circuit L13b to an input terminal <13> thereof. This data is a slot enable signal SE#3 corresponding to slot #3.

The counter 43 is incremented by a next reference pulse P1 (at a point of time T7 in FIG. 8), thereby to output data "14". Then, the selector circuit 42 outputs the slot enable signal SE#2. The counter 43 is incremented again by a next reference pulse P1 (at a point of time T8 in FIG. 8), thereby to output data "15". Then, the selector circuit 42 outputs the slot enable signal SE#1. With the count "15" of the counter 43, a next reference pulse P1 (at a point of time T9 in FIG. 8) causes the output data "13" of the latch circuit LN2 to be preset to the counter 43 again. As a result, the selector circuit 42 outputs the slot enable signal SE#3. The slot enable signals SE#2 and SE#1 are outputted in synchronism with subsequent reference pulses P1. In this way, a bus cycle formed of the slot enable signals SE#1–SE#3 is repeated.

(C) Decreasing the number of slots:

Upon completion of data transfer between certain external data processing units 2, these processing units 2 transmit notice to that effect to the system controller 5. Then, the system controller 5 transmits a command to the bus controller 4 to eliminate the slot having been used in the above data transfer. This operation will be described on the assumption that slots #1–#4 have been used and slot #2 is to be eliminated. Reference will be made to the timing chart of FIG. 9.

Figure 5:
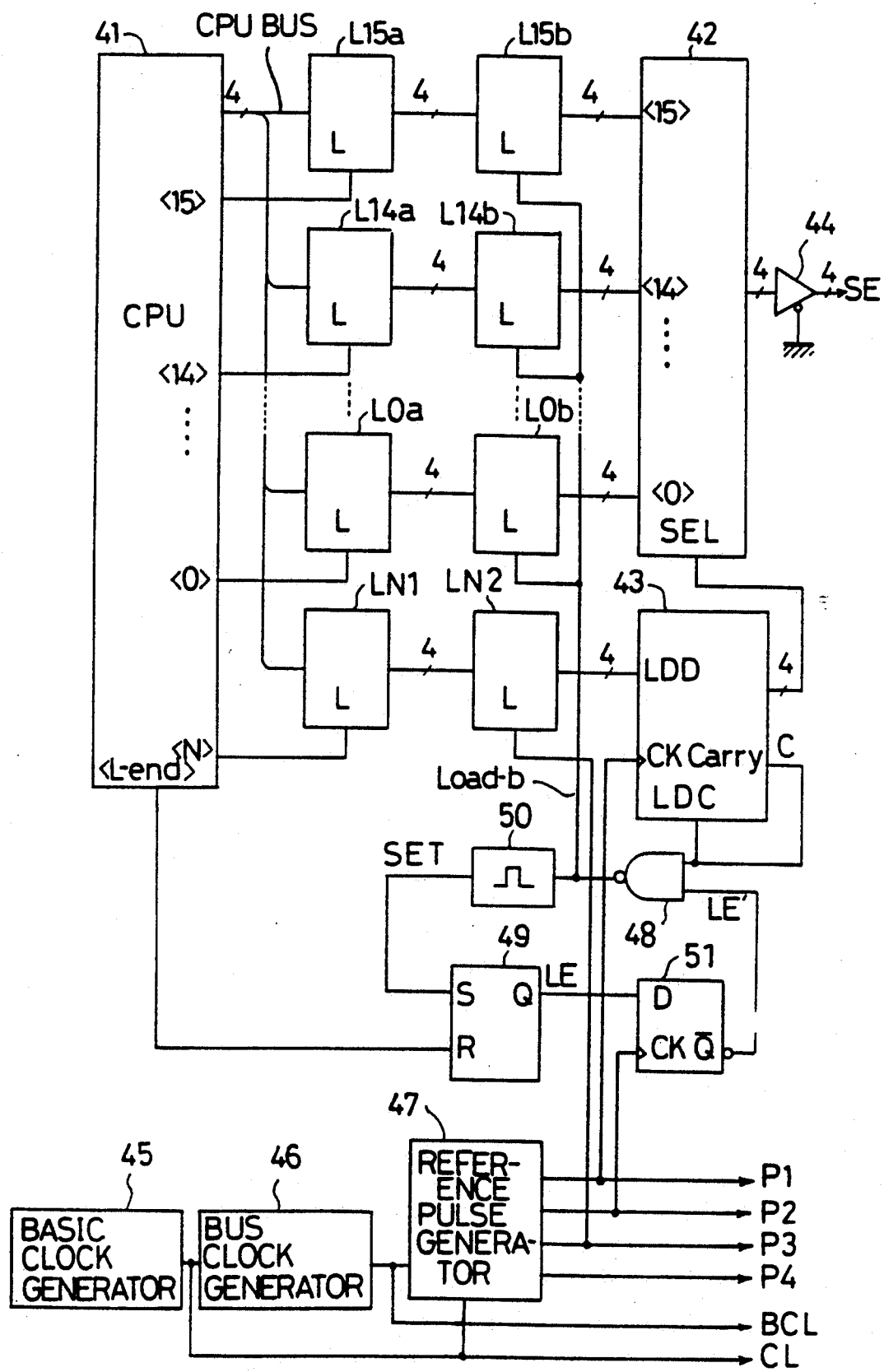
FIG. 5 is a block diagram showing details of a bus controller.
Figure 9:
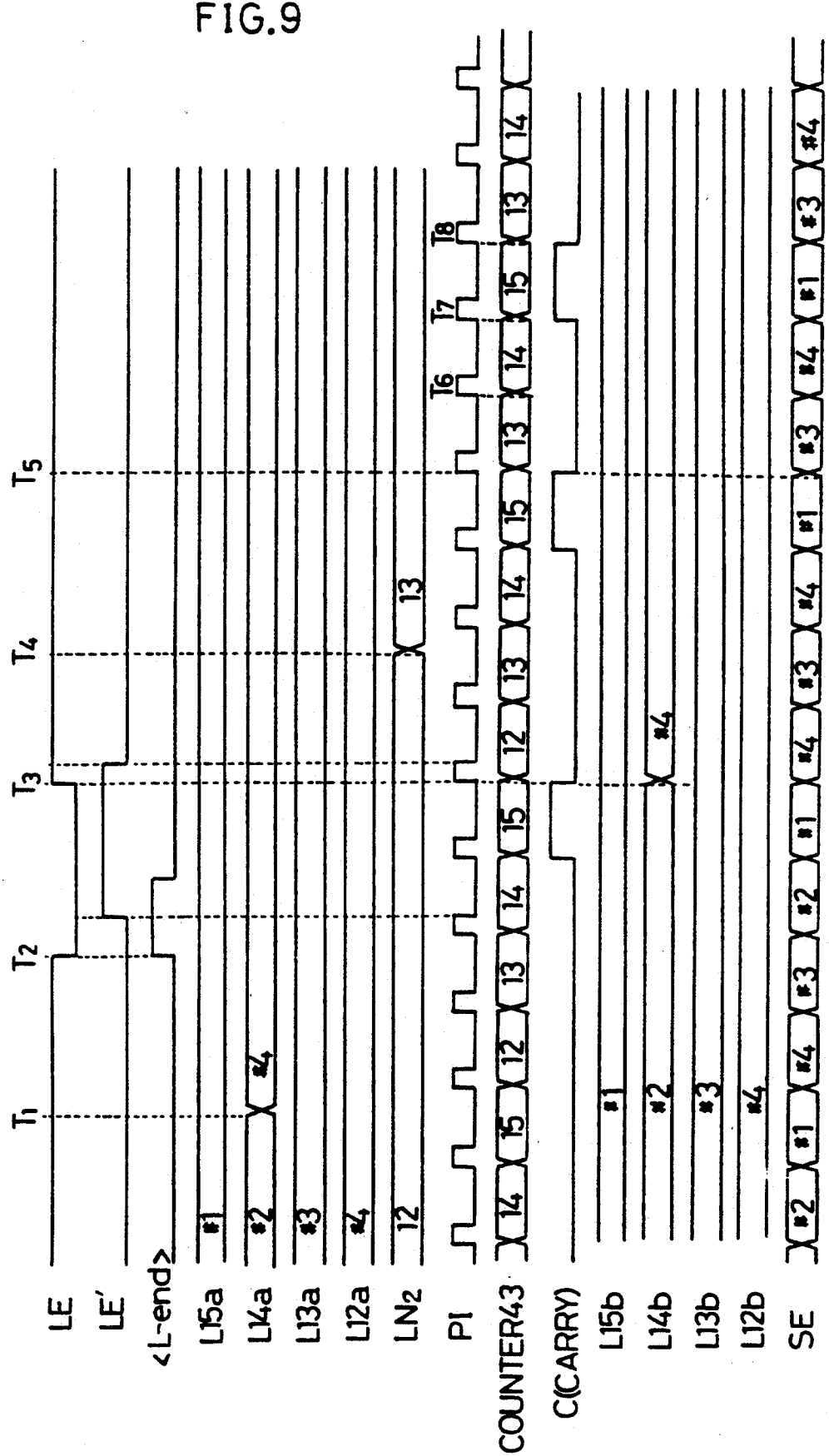
FIG. 9 is a timing chart showing an operation of the bus controller for decreasing the number of bus slots.

In response to the command from the system controller 5 to eliminate slot #2, the CPU 41 of the bus controller 4 sets the value of slot #4 to the latch circuit L14a in FIG. 5 corresponding to slot #2 (at a point of time T1 in FIG. 9). Next, in order to transfer this data to the output latch circuit L14b, the CPU 41 generates control pulses at the output port <L-end> (at a point of time T2 in FIG. 9). These control pulses cause the value of slot #4 to be latched by the latch circuit L14b with a next fall of the carry signal C of the counter 43 (at a point of time T3 in FIG. 9). The slots outputted to the bus thereafter are such that slot #4 appears twice in one bus cycle in place of slot #2 now eliminated.

Next, in order to rectify the slots appearing in one bus cycle, the CPU 41 sets to the latch circuit LN1 in FIG. 5, the value "13" complementary to "3" which is the correct number of slots in the bus cycles. This value is latched by the latch circuit LN2 with a next rise of reference pulses P3 (at a point of time T4 in FIG. 9). The output data of the latch circuit LN2 is preset to the counter 43 with a next fall of the carry signal C (at a point of time T5 in FIG. 9). As a result, the selector circuit 42 selects the data inputted to the input terminal <13> thereof, and outputs the slot enable signal SE#3.

The counter 43 is incremented by a next reference pulse P1 (at a point of time T6 in FIG. 9), thereby to output count "14". Consequently, the selector circuit 42 selects the data inputted to the input terminal <14>, and outputs the slot enable signal SE#4. The counter 43 outputs count "15" with a next reference pulse P1 (at a point of time T7 in FIG. 9), whereby the selector circuit 42 outputs the slot enable signal SE#1. With the count "15" of the counter 43, a next rise of reference pulses P1 (at a point of time T8 in FIG. 9) causes the output data "13" of the latch circuit LN2 to be preset to the counter 43 again. Subsequently, as in the foregoing operation, a bus cycle formed of the slot enable signals SE#3, SE#4 and SE#1 is repeated in synchronism with the reference pulses P1.

(D) Other type of slot generation:

There may be a case in which data transfer between particular external data processing units 2 should be effected faster than those between other processing units 2. In such a case, the system controller 5 commands the bus controller 4 to generate a particular slot plural times in one bus cycle, depending on a required data transfer rate, as shown in FIG. 3(d).

Assume that, in data transfer using slots #1–#6, slot #4 is caused to appear four times in one bus cycle, for example. Since one bus cycle includes nine slots in this case, the CPU 41 sets "7" to the latch circuit LN1. Consequently, the counter 43 outputs counts "7" to "15" to the selector circuit 42 in synchronism with reference pulses P1.

On the other hand, the CPU 41 sets data of slots #1–#6 used to the latch circuits L15a–L7a. Since slot #4 appears four times in one bus cycle, the data of slot #4 is set to four latch circuits. In this embodiment, the slots are set to the latch circuits L15a–L7a in the order of #1, #4, #2, #4, #3, #4, #5, #4 and #6. The same slot is dispersed in the above arrangement since the interface circuits 3 are constructed such that the same interface circuit 3 is prohibited from continuously transmitting or receiving data by means of adjacent slots.

The data in the latch circuits L15a–L7a are latched by the latch circuits L15b–L7b with falls of the carry signal C outputted from the counter 43. Subsequently, slot enable signals SE#1, SE#4, SE#2, SE#4, SE#3, SE#4, SE#5, SE#4 and SE#6 are outputted in succession with variations in the count of counter 43 and synchronously with reference pulses P1.

While, in the above example, slot #4 is caused to appear plural times in one bus cycle, it is possible to cause different types of slots to appear plural times in one bus cycle, respectively.

Figure 10:
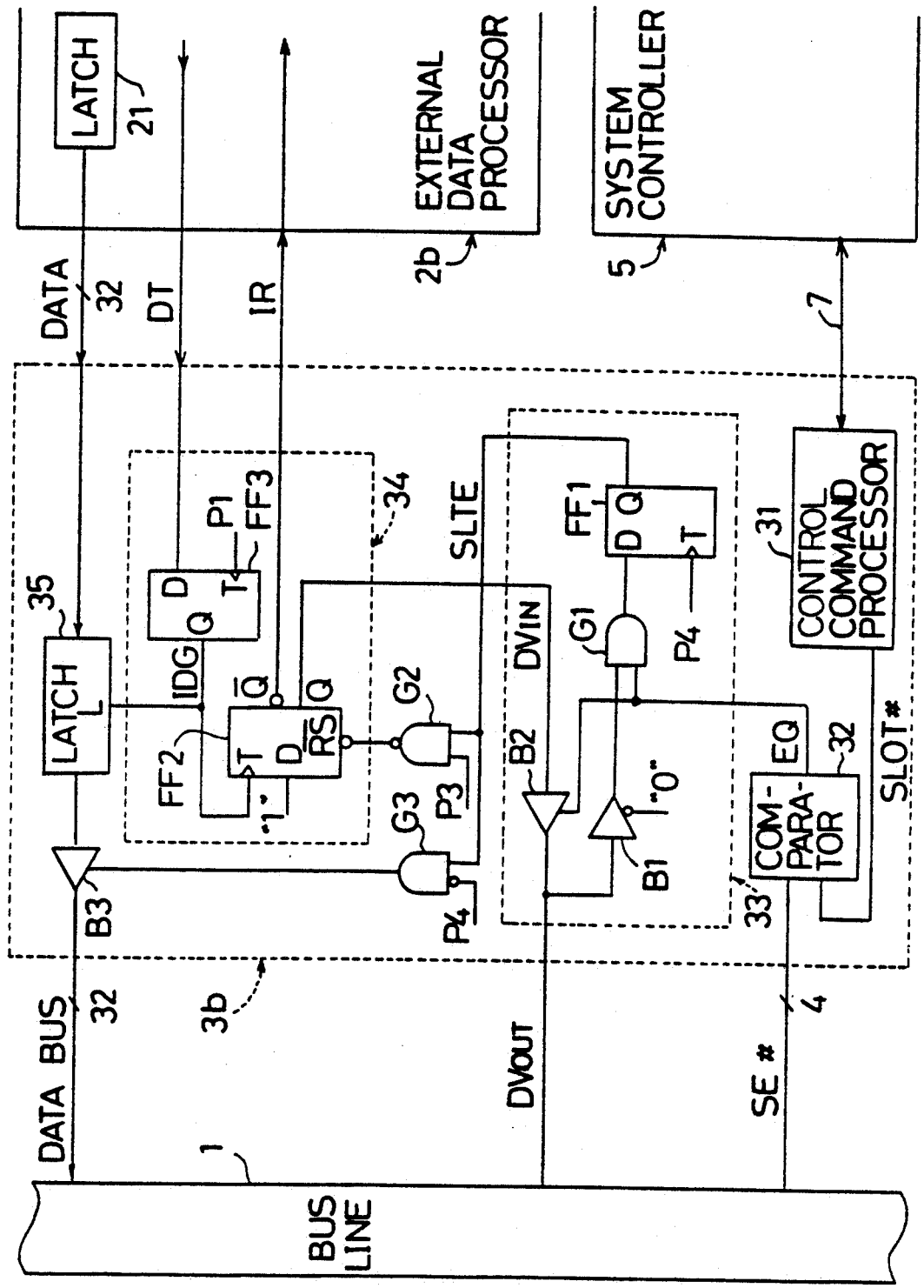
FIG. 10 is a block diagram showing a specific construction of an interface circuit for data transmission only.

This ends the description of the operations of the bus controller 4. Next, specific constructions of interface circuit 3a for data reception only and interface circuit 3b for data transmission only, shown in FIG. 4, will be described. The interface circuits 3 capable of both data reception and data transmission have a construction combining those of the interface circuits 3a and 3b, and their construction will not be described. The construction of the interface circuit 3b for data transmission only will be described first with reference to FIG. 10.

The interface circuit 3b includes a control command processor 31 for receiving a slot set command from the system controller 5 through the command line 7 and setting a slot number (SLOT #), a comparator 32 for comparing the slot number with slot enable signals SE# successively transmitted from the bus controller 4, a first handshake processor 33 for validating output of the comparator 32 based on a handshake with a receiving interface circuit 3 through the data valid lines of the bus line 1, a second handshake processor 34 for handshaking with the external data processing unit 2b, and a latch circuit 35 for latching data received from the external data processing unit 2b. Though not shown, the interface circuit 3b also includes internal circuits for generating reference pulses P1–P4 as shown in FIG. 6, based on the reference clock CK and bus clock BCK received from the bus controller 4.

An operation of the interface circuit 3b will be described hereinafter with reference to the timing chart of FIG. 11. The hatched regions in FIG. 11 signify that data or levels may be in any conditions.

It is assumed here that data is transferred by means of slot #1. Upon receipt of a command from the system controller 5 to establish slot #1, the control command processor 31 generates a data (i.e. 4-bit data [0001]) corresponding to slot #1, and applies this data to one input of the comparator 32. The comparator 32 compares the slot number set by the control command processor 31 with the slot enable signals SE# successively transmitted from the bus controller 4. When the slot enable signal SE#1 corresponding to slot #1 is received, the comparator 32 outputs a match signal EQ to the first handshake processor 33 (at a point of time T1 in FIG. 11).

If, at this time, the receiving interface circuit 3 is in a state for accepting data and a DVout signal in "H" level is on the data valid lines, this DVout signal is applied to one input of an AND gate G1 through a buffer B1. As a result, the match signal EQ of the comparator 32 passes through the AND gate G1 and enters a D-terminal of a flip-flop FF1. This match signal EQ is latched with a rise of reference pulses P4 (at a point of time T2 in FIG. 11) applied to a T-terminal of the flip-flop FF1.

An output signal SLTE of the flip-flop FF1 is applied to one input of a NAND gate G2 and one input of an AND gate G3. Assume that a data to be transferred is latched by the latch circuit 35 at present. Then, output of the AND gate G3 is in "H" level during a period of no reference pulse P4 (i.e. a period from reference pulse P1 to reference pulse P3). As a result, the buffer B3 is opened to output the data of latch circuit 35 to the data bus. The data are transferred, avoiding the periods of reference pulses P4, in order to prevent the data transferred by adjacent slots from interfering with each other on the data bus.

On the other hand, when a next reference pulse P3 is applied to the other input of the NAND gate G2 (at a point of time T3 in FIG. 11), with the output signal SLTE of the flip-flop FF1 applied to the one input thereof, output of the NAND gate G2 rises to activate a reset terminal RS-bar of a flip-flop FF2 in the second handshake processor 34. As a result, Q-bar output of the flip-flop FF2 becomes "H" level which is applied as a data input ready signal IR to the external data processing unit 2b. At this time, an output signal DVin from a Q-terminal of the flip-flop FF2 becomes "L" level. This output signal DVin is outputted to the data valid line through a buffer B2 in the first handshake processor 33 to notify the receiving interface circuit 3 that data are not outputted thereto.

Figure 11:
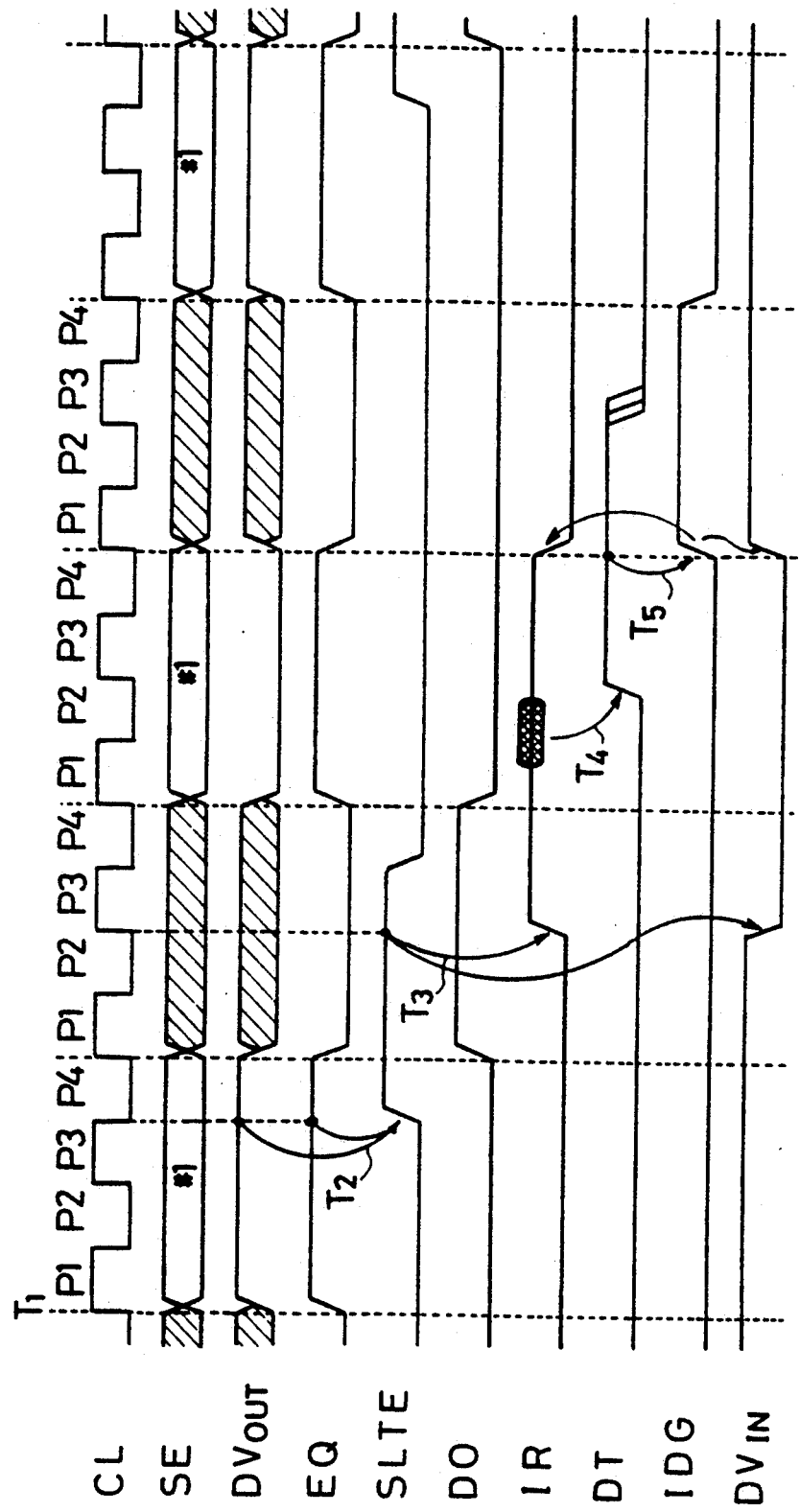
FIG. 11 is a timing chart showing an operation of the interface circuit for data transmission only.

When a CPU (not shown) of the external data processing unit 2b confirms the data input ready signal IR is in "H" level, the CPU outputs a data transfer signal DT to a flip-flop FF3 of the interface circuit 3b (at a point of time T4 in FIG. 11). Consequently, the flip-flop FF3 in the second handshake processor 34 latches the data transfer signal DT and outputs an "H" level signal with a next rise of reference pulses P1 (at a point of time T5 in FIG. 11). This output signal IDG is applied to the latch circuit 35, whereby a next data outputted from a latch circuit 21 in the external data processing unit 2b is latched by the latch circuit 35. In this example, the data transfer signal DT has a pulsewidth larger than the period of the reference pulse P1, and the data inputted to the latch circuit 35 is sufficiently stable and definite.

When the signal IDG becomes "H" level, the output of flip-flop FF2 is reversed to raise the signal DVin for handshake to "H" level, thereby to notify the receiving interface circuit 3 of the condition ready to transmit data.

Subsequently, as described above, the bus controller 4 transmits the slot enable signal SE#1, and the signal DVout for handshake becomes "H" level, whereby the data is transmitted from the latch circuit 35.

Figure 12:
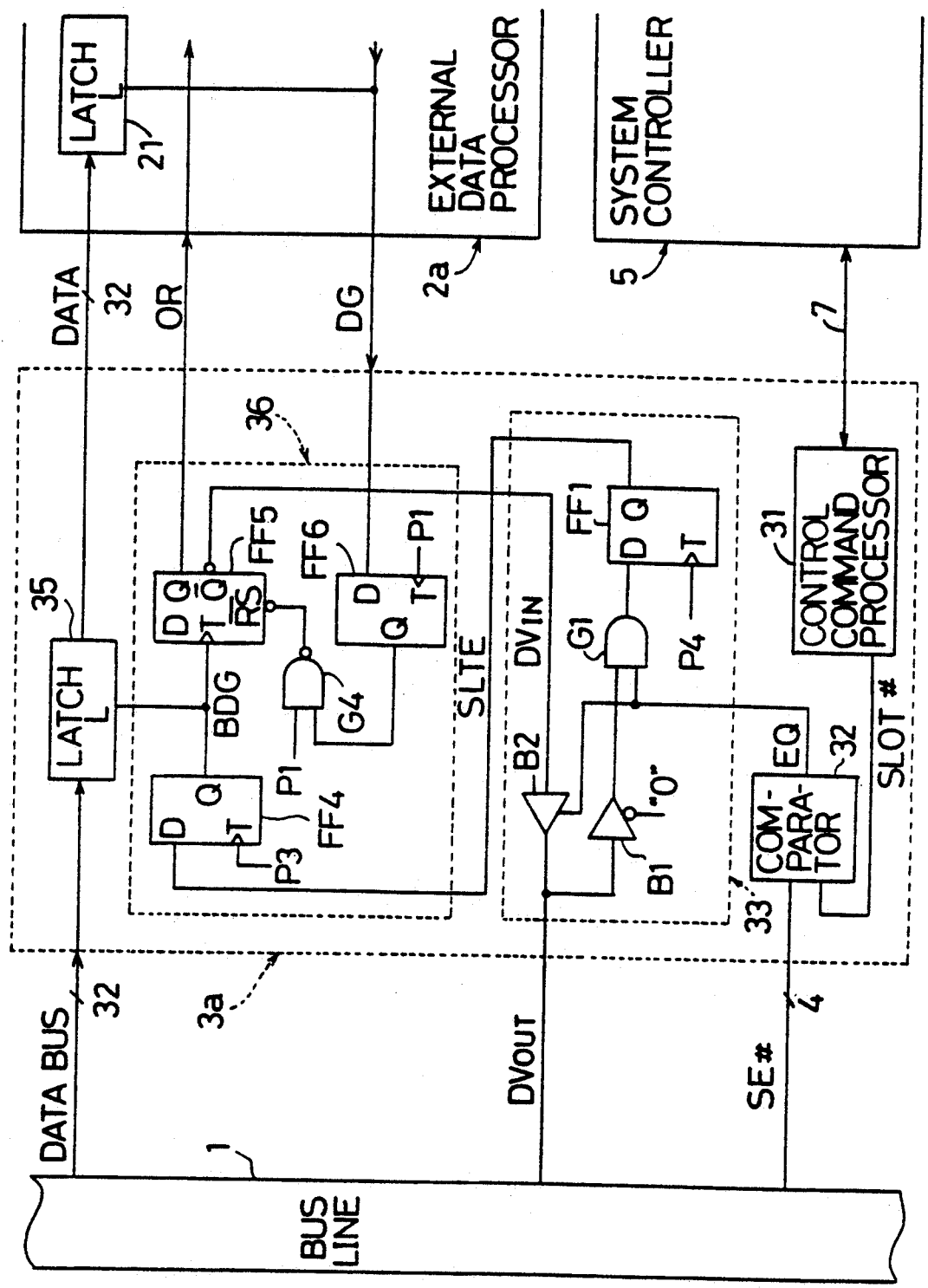
FIG. 12 is a block diagram showing a specific construction of an interface circuit for data reception only.

Next, the construction of the interface circuit 3a for data reception only will be described with reference to FIG. 12.

The interface circuit 3a for data reception only, as does the interface circuit 3b for data transmission only, includes a control command processor 31, a comparator 32, a first handshake processor 33, and a second handshake processor 36. The second handshake processor 36 is peculiar to the interface circuit 3a.

An operation of the interface circuit 3a will be described hereinafter with reference to the timing chart of FIG. 13. It is assumed here that data is transferred by means of slot #1.

Figure 13:
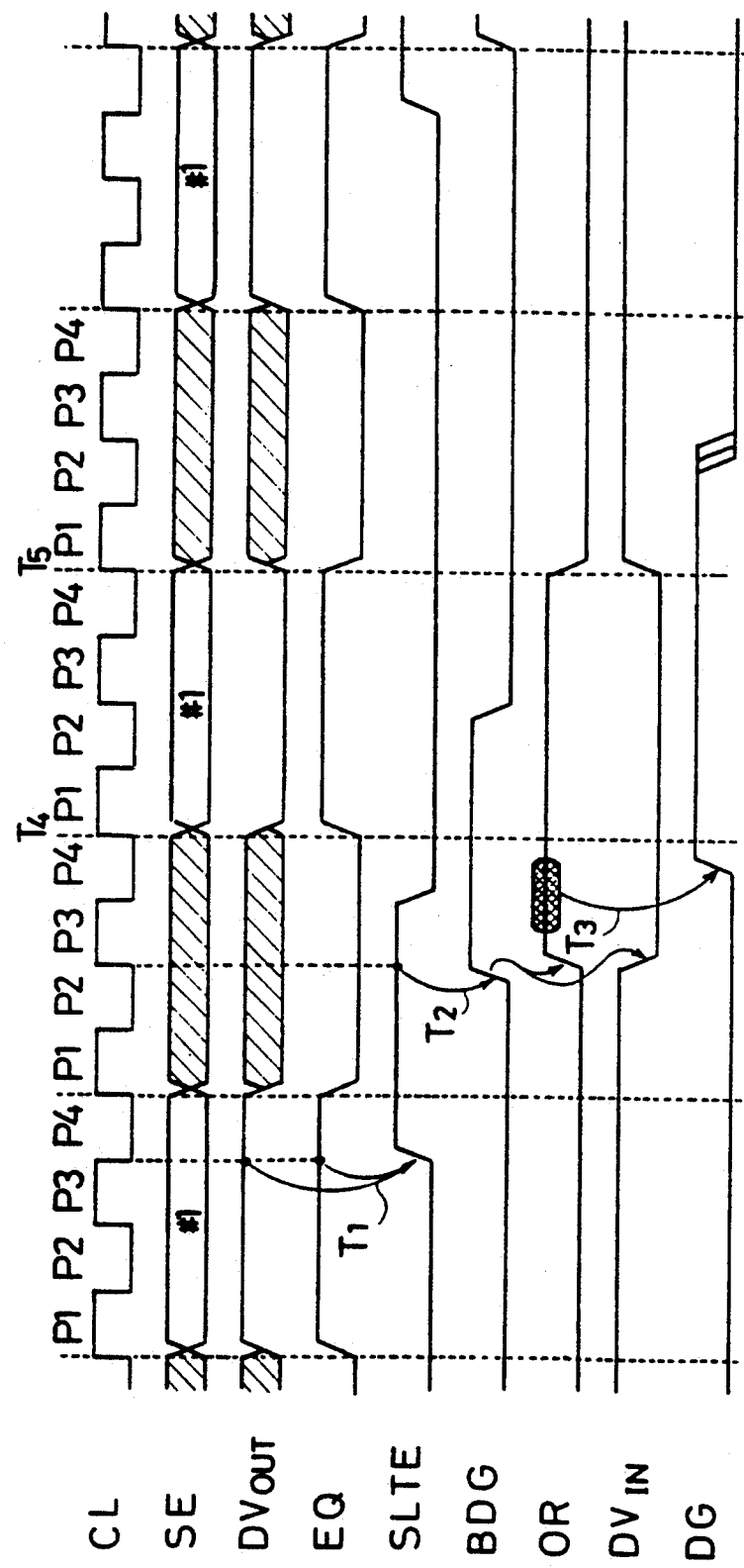
FIG. 13 is a timing chart showing an operation of the interface circuit for data reception only.

As in the interface circuit 3b described above, when the signal DVout on the data valid line in the bus line 1 is in "H" level, and the slot enable signal SE#1 is transmitted from the bus controller 4, the comparator 32 outputs a match signal EQ whereby the first handshake processor 33 outputs a signal SLTE in "H" level (at a point of time T1 in FIG. 13). This signal SLTE is inputted to a D-terminal of a flip-flop FF4 in the second handshake processor 36.

An output signal BDG of a Q-terminal of the flip-flop FF4 becomes "H" level with a rise of reference pulses P3 inputted to a T-terminal thereof (at a point of time T2 in FIG. 13). This signal BDG causes a latch circuit 35 to latch data from the bus line 1.

With the signal BDG becoming "H" level, output of a Q-terminal of a flip-flop FF5 becomes "H" level and output of a Q-bar terminal "L" level. The Q output is transmitted as a data output ready signal OR to a CPU (not shown) of the external data processing unit 2a. The Q-bar output (signal DVin) is outputted to the data valid line through a buffer B2 in the first handshake processor 33. The data valid line is changed to "L" level to notify the transmitting interface circuit 3 that data cannot be accepted.

Upon receipt of the data output ready signal OR, the CPU of the external data processing unit 2a returns a data gain signal DG to the second handshake processor 36 (at a point of time T3 in FIG. 13). At the same time, the CPU causes a latch circuit 21 in the external data processing unit 2a to latch data from the latch circuit 35. It is assumed here that the signal DG has a pulsewidth larger than the period of reference pulse P1.

The signal DG is received by a flip-flop FF6 in the second handshake processor 36 whose Q output is reversed to "H" level with a next rise of reference pulses P1 (at a point of time T4 in FIG. 13). This Q output is applied to one input of a NAND gate G4. Output of the NAND gate G4 becomes active with a next rise of reference pulses P1 (at a point of time T5 in FIG. 13). As a result, the flip-flop FF5 is reset to reverse the Q output and Q-bar output, thereby changing the data output ready signal OR to "L" level and the signal DVin to "H" level. From the data output ready signal OR in "L" level, the external data processing unit 2a learns that interface circuit 3a is not ready to output data. With the signal DVin in "H" level, the interface circuit 3a notifies the transmitting interface circuit 3 of readiness to accept data.

Subsequently, as described above, when the signal DVout on the data valid line in the bus line 1 is in "H" level, and the slot enable signal SE#1 is transmitted, the comparator 32 outputs the match signal EQ whereby the first handshake processor 33 outputs the signal SLTE to cause the latch circuit 35 to latch the data on the data bus. By establishing a handshake with the external data processing unit 2a, the data is transferred from the latch circuit 35 to the external data processing unit 2a.

The constructions of bus controller 4 acting as a bus controlling device, and interface circuits 3a and 3b acting as modules are not limited to the foregoing embodiment, but may be varied as desired. The bus controller 4 will serve the purpose if operable in response to the commands from the system controller 5 for generating bus slots adequate to data transfer between the external data processing units 2. The interface circuits 3 will serve the purpose if operable for comparing a series of slot enable signals transmitted from the bus controller 4 with slot numbers received from the system controller 5 in advance, and exchange data with the data bus upon agreement therebetween.

The present invention may be embodied in other specific forms without departing from the spirit or essential attributes thereof and, accordingly, reference should be made to the appended claims, rather than to the foregoing specification, as indicating the scope of the invention.

What is claimed is:

1. An apparatus for transferring data in a time-sharing mode by setting bus slots as minimum time units of data transfer and repeating a bus cycle formed of a plurality of bus slots corresponding to the number of data transfer requests, said apparatus comprising:
   a plurality of modules connected to a common bus line for transferring data therethrough, bus control means coupled to said common bus line for controlling a time-sharing transfer of data between said modules through said bus line, and system control means connected to said modules and said bus control means through a bidirectional command line;
   wherein said system control means is operable, upon receipt of a data transfer request from certain of said modules, to command said bus control means to generate a bus slot necessary for the data transfer, and to notify said certain of said modules of a slot number for use in the data transfer, and upon receipt of data completion transfer notice from said certain of said modules, to command bus control means to eliminate said bus slot;
   said bus control means is operable, upon receipt of a slot set command from said system control means, to set a new bus slot to a bus cycle including a group of bus slots currently used, thereby increasing the number of bus slots, and to transmit through said bus line to said modules slot enable signals peculiar to the respective bus slots repeatedly, and upon receipt of a slot eliminate command from said system control means, to eliminate from the bus cycle a designated one of the bus slots currently used in the data transfer, thereby decreasing the number of bus slots, and to transmit through said bus line to said modules the slot enable signals peculiar to the remaining bus slots repeatedly; and
   each of said modules is operable to compare successively a series of slot enable signals received from said bus control means with a slot number given in advance by said system control means, and to exchange data with said bus line upon agreement between the slot enable signals and the slot number.

2. An apparatus as defined in claim 1, wherein said bus line includes a data bus formed of a plurality of signal lines for use in the data transfer between said modules, and a control bus formed of a plurality of signal lines for use in control of said time-sharing transfer of data between said modules, said control bus including at least one signal line for transmitting a clock signal that determines timing of said time-sharing transfer of data, a plurality of signal lines for transmitting said slot enable signals, and at least one signal line for allowing a handshake between said certain of said modules.

3. An apparatus as defined in claim 2, wherein each of said modules includes:
   an interface circuit connected to said bus line and said command line and having at least one of functions to receive data and to transmit data; and
   an external data processing unit for transferring data through a handshake with said interface circuit.

4. An apparatus as defined in claim 2, wherein said bus control means includes:
   clock signal generating means for generating said clock signal that determines timing of said time-sharing transfer of data, and transmitting said clock signal to said modules through one of the signal lines in said control bus;
   slot setting means operable in response to one of said slot set command and said slot eliminate command from said system control means to output a slot number data corresponding to a designated bus slot number and to output a number-of-set-slots data corresponding to the number of bus slots constituting one bus cycle;
   latch means for latching said slot number data and said number-of-set-slots data outputted from said slot setting means;
   select signal generating means operable in response to said number-of-set-slots data received from said latch means to generate a select signal of a type corresponding to said number-of-set-slots data with the timing determined by said clock signal; and
   slot number data selecting means operable in response to said select signal received from said select signal generating means to select successively the slot number data latched by said latch means, and to transmit the slot number data as the slot enable signals to said modules through certain of signal lines in said control bus.

5. An apparatus as defined in claim 4, wherein said latch means includes:
   a first group of latch circuits for latching, with timing determined by said slot setting means, said slot number data and said number-of-set-slots data outputted from said slot setting means; and
   a second group of latch circuits for latching, with the timing determined by said clock signal generated by said clock signal generating means, said slot number data and said number-of-set-slots data latched by said first group of latch circuits.

6. An apparatus as defined in claim 3, wherein said interface circuit having the function to transmit data includes:
- comparing means for successively comparing the slot number received from said system control means through said command line for use in the data transfer, with the series of slot enable signals received from said bus control means through said control bus, and outputting a match signal when said slot number coincides with one of said slot enable signals;
- first handshake processing means for validating said match signal received from said comparing means, based on a handshake with a receiving module through said control bus;
- second handshake processing means for establishing a handshake with said external data processing unit connected to said interface circuit;
- latch means for latching data from said external data processing unit in response to a command from said second handshake processing means; and
- buffer means for outputting the data latched by said latch means to said data bus in response to a command from said first handshake processing means.

7. An apparatus as defined in claim 3, wherein said interface circuit having the function to receive data includes:
- comparing means for successively comparing the slot number received from said system control means through said command line for use in the data transfer, with the series of slot enable signals received from said bus control means through said control bus, and outputting a match signal when said slot number coincides with one of said slot enable signals;
- first handshake processing means for validating said match signal received from said comparing means, based on a handshake with a transmitting module through said control bus;
- latch means for latching data on said data bus in response to a command from first handshake processing means; and
- second handshake processing means for establishing a handshake with said external data processing unit connected to said interface circuit, thereby to transfer the data latched by said latch means to said external data processing unit.

* * * * *